US011550904B2

(12) United States Patent
Guajardo Merchan et al.

(10) Patent No.: US 11,550,904 B2
(45) Date of Patent: Jan. 10, 2023

(54) SYSTEM AND METHOD FOR IMPROVING MEASUREMENTS OF AN INTRUSION DETECTION SYSTEM BY TRANSFORMING ONE DIMENSIONAL MEASUREMENTS INTO MULTI-DIMENSIONAL IMAGES

(71) Applicant: Robert Bosch GmbH, Stuttgart (DE)

(72) Inventors: Jorge Guajardo Merchan, Pittsburgh, PA (US); Stefan Gehrer, Pittsburgh, PA (US); Benjamin Hettwer, Stuttgart (DE); Samarjit Das, Sewickley, PA (US)

(73) Assignee: ROBERT BOSCH GMBH

( * ) Notice: Subject to any disclaimer, the term of this patent is extended or adjusted under 35 U.S.C. 154(b) by 319 days.

(21) Appl. No.: 17/002,259

(22) Filed: Aug. 25, 2020

(65) Prior Publication Data

US 2022/0067149 A1 Mar. 3, 2022

(51) Int. Cl.
*G06F 21/55* (2013.01)
*G06N 3/04* (2006.01)
*G06N 3/08* (2006.01)

(52) U.S. Cl.
CPC ............. *G06F 21/552* (2013.01); *G06N 3/04* (2013.01); *G06N 3/08* (2013.01); *G06F 2221/034* (2013.01)

(58) Field of Classification Search
CPC ................................ G06F 21/552; G06N 3/04
See application file for complete search history.

(56) References Cited

U.S. PATENT DOCUMENTS

| 8,762,733 | B2 * | 6/2014 | Derchak | ............... | A61B 5/6824 |
| | | | | | 704/250 |
| 9,798,513 | B1 * | 10/2017 | Pereira | .................... | G10L 25/51 |
| 10,678,828 | B2 * | 6/2020 | Cramer | .................. | G06F 16/35 |
| 10,679,481 | B2 * | 6/2020 | Safavi | .................. | G08B 29/186 |
| 11,303,671 | B2 * | 4/2022 | Leng | ........................ | G06N 3/08 |
| 2019/0379589 | A1 * | 12/2019 | Ryan | ...................... | G06N 3/084 |
| 2020/0086497 | A1 * | 3/2020 | Johnson | ................ | B25J 9/1674 |
| 2021/0357451 | A1 * | 11/2021 | Wold | ..................... | G06F 40/30 |

\* cited by examiner

*Primary Examiner* — Viral S Lakhia

(57) ABSTRACT

A system includes memory, a processor in communication with the memory. The processor is programmed to define a fingerprint that includes a baseline measurement of a physical attribute of at least a separate processor during an enrollment period of the system, wherein the enrollment period includes measuring the physical attribute of the processor prior to runtime operation, receiving a runtime measurement from a sensor regarding the physical attribute of at least the separate processor during runtime, comparing the runtime measurement of the physical attribute to the fingerprint, and outputting a multi-dimensional domain image in response to the runtime measurement.

19 Claims, 3 Drawing Sheets

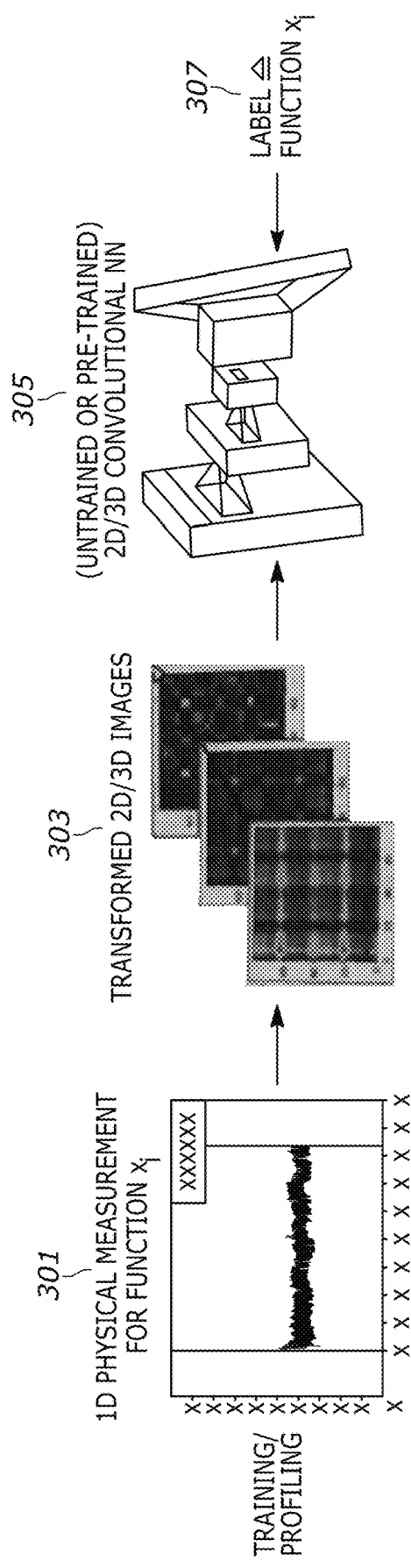

SYSTEM AND METHOD FOR IMPROVING MEASUREMENTS OF AN INTRUSION DETECTION SYSTEM BY TRANSFORMING ONE DIMENSIONAL MEASUREMENTS INTO MULTI-DIMENSIONAL IMAGES

TECHNICAL FIELD

The present disclosure relates to security of a computer system, such as a vehicle computer system or other type of system.

BACKGROUND

Modern automotive in-vehicle networks present a large attack surface from a security point of view, due to both the amount of Electrical Control Units (ECUs) and their connectivity to external networks. Detecting a malicious intrusion into such networks is an integral part of automotive security to prevent or at least lower the impact of attacks.

SUMMARY

According to one embodiment, a system includes memory, a processor in communication with the memory. The processor is programmed to define a fingerprint that includes a baseline measurement of a physical attribute of at least a separate processor during an enrollment period of the system, wherein the enrollment period includes measuring the physical attribute of the processor prior to runtime operation, receive a runtime measurement from a sensor regarding the physical attribute of at least the separate processor during runtime, compare the runtime measurement of the physical attribute to the fingerprint, and output a multi-dimensional domain image in response to the runtime measurement.

According to another embodiment, a computer-implement method includes receiving a baseline measurement that includes a physical attribute of at least a processor during an enrollment period, wherein the enrollment period includes measuring the physical attribute of the processor prior to runtime operation, receiving a runtime measurement from a sensor regarding the physical attribute of at least the processor during runtime, and outputting a multi-dimensional domain image in response to the runtime measurement.

According to yet another embodiment, a system includes memory and a processor in communication with the memory. The processor is programmed to receive a plurality of runtime measurements from a plurality of sensors regarding a physical attribute of at least a separate processor during runtime, wherein the runtime measurement is a one-dimensional measurement, convert each of the plurality of the runtime measurements to a multi-dimensional image, and send the multi-dimensional image to a neural network and output a classification of the multi-dimensional image utilizing the neural network.

BRIEF DESCRIPTION OF THE DRAWINGS

FIG. 3 illustrates a flow chart of an enrollment period of the computing device.

FIG. 4 illustrates a flow chart of run time period of the computing device.

DETAILED DESCRIPTION

Figure 1:
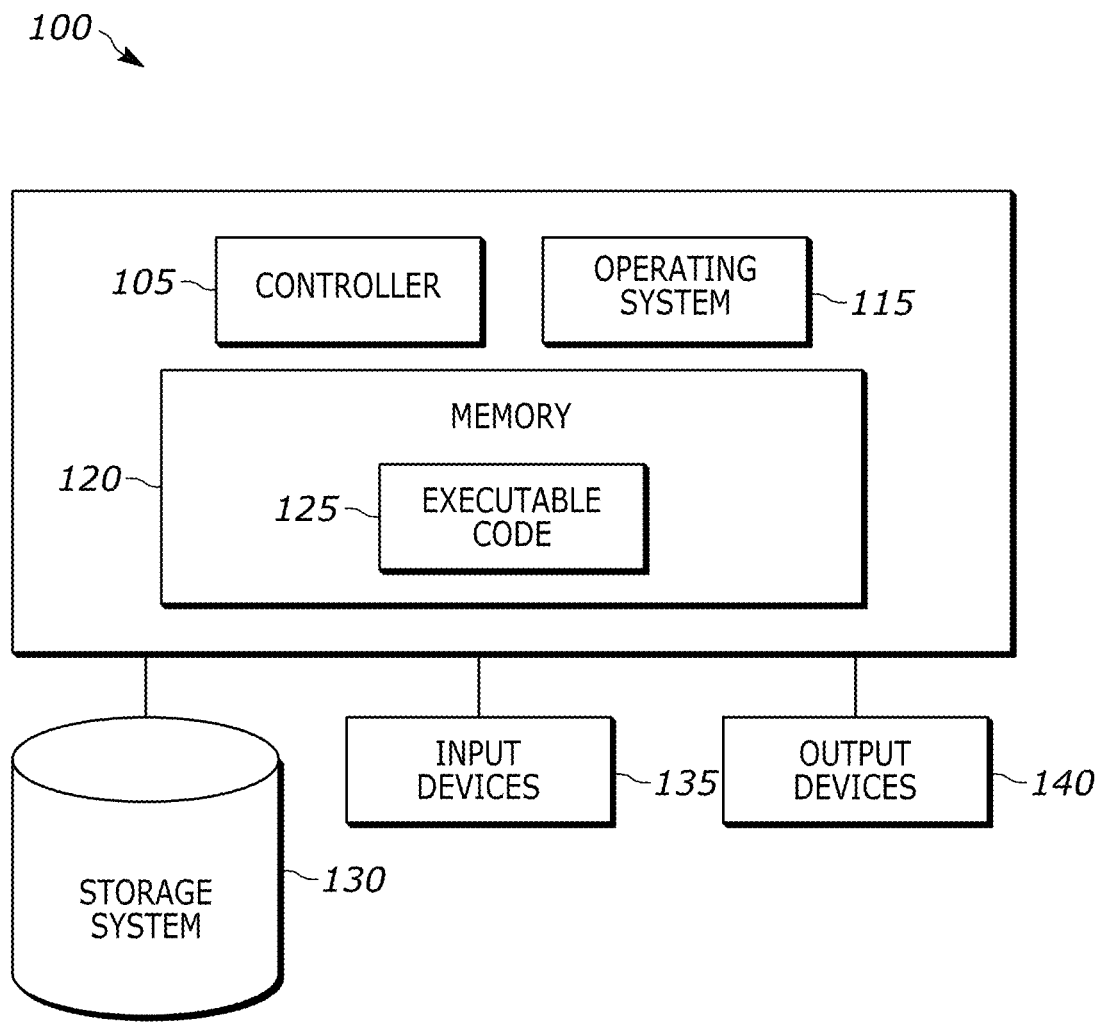
FIG. 1 illustrates a block diagram of an exemplary computing device, according to some embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The illustrative embodiment introduces a system and method to detect malicious attacks. A physical property of a device or electronic control unit (ECU) connected to an in-vehicle bus may constantly be measured. Due to their enhanced connectivity with internal and external networks, modern automotive Microcontroller Unit (MCUs) can be subject to malicious attacks by software or parameter modification. In the automotive world, such attacks, even for a short period of time, can be severe and thus run-time detection of these attacks are vital to the automotive safety and security.

One of the downsides to a Machine Learning (ML) based Intrusion Detection System (IDS) is the need for preprocessed features from the raw measurements. This pre-processing introduces certain limitations in both computational complexity and accuracy. Deep Learning (DL) based methods, on the other hand, are able to work on the raw traces, as they learn/train extract their own features, and combine these extracted features to classify the input. Many deep learning methods are optimized for multi-dimensional input data (2D or 3D grayscale/color images and videos). The traces in this use case are, however, one-dimensional. Hence, they cannot make use of many technical improvements made in the DL-based image classification domain. In general, the system may be trying to improve the ability of any classification to make the right decision when it comes to classifying whether a particular software routine was executed in an embedded processor not and, importantly, whether the software route has been modified.

The system may utilize an external or internal sensor to perform a device measurement of a physical property (e.g. power, timing, sound, temperature, vibration, etc.) to perform an initial baseline measurement. This measurement is used to derive a fingerprint using, for example, ML techniques, signal processing techniques or a combination thereof.

The prior art fails to utilize multiple sensory streams to create the equivalent of a single "color" image, with multiple color channels, for different parameters of a given one-dimensional (1D)-two-dimensional (2D) feature extractor. In this disclosure, the system creates these images and apply it to the classification of physical processes in the context of intrusion detection in both networks and hosts. In such embodiments, multiple streams of data can include: power consumption (voltage, power, or current depending on the measurement circuit available), electromagnetic (EM) radiation, RF radiation, sound, vibrations, frequencies of signals (histograms) over time, timing information, heat information, etc. Thus, the system disclosed below may analyze the different input streams together as a single image.

In another embodiment, different representations (e.g., 1D-2D image feature extractors for different parameters) can be used for purposes of machine learning model training and, in particular, of data augmentation for machine learning training. It may be often the case that machine learning models require significant data as input during the training phase (also called enrollment in the following). It is often the case that getting enough training data is challenging and costly. One way in which the cost of collecting data can be reduced is by generating new data from a reduced set of traces. This disclosure introduces such a method as well implied by such representations via the multi-dimensional image.

As shown in FIG. 1, which shows a block diagram of an exemplary computing device, according to some embodiments of the disclosure. A device 100 may include a controller 105 that may be, for example, a central processing unit (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authentication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a nonvolatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, microphones, analog to digital converters, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device, JTAG interface, or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, microprocessors, transceivers, microcontrollers, a plurality of computer or network devices, any other suitable computing device, and/or any combination thereof. For example, a system as described herein may include one or more devices such as computing device 100.

Figure 2:
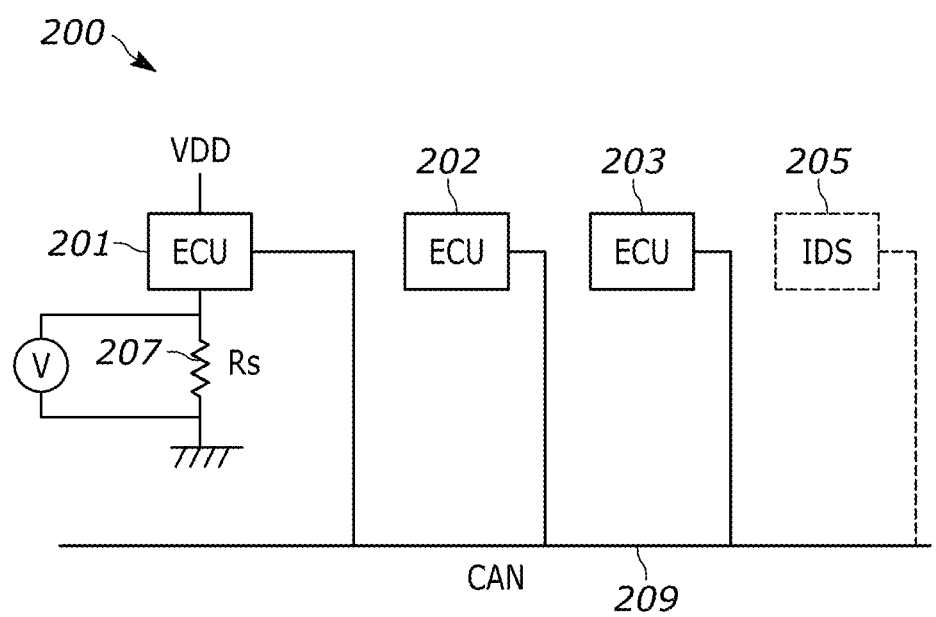
FIG. 2 illustrates an exemplary block diagram of a computing device utilizing a shunt resistor to measure current drawn from an ECU attached to a CAN bus.

FIG. 2 illustrates an exemplary block diagram of a computing device utilizing a shunt resistor to measure current drawn from an ECU attached to a CAN bus. The circuit 200 may include a first ECU 201, second ECU 202, third ECU 203, an intrusion detections system (IDS) 205, and a shunt resistor 207. The circuit may connect each of these components by a CAN bus 209. The CAN bus 209 may be utilized to allow various ECUs or controllers in the vehicle to communicate with one another. The IDS 205 may be utilized to store a fingerprint and other secure data related to the system. The fingerprint may be used as a profile of the ECU or circuit and be utilized by the IDS to detect malicious behavior. While multiple ECUs are shown in circuit 200, alternative embodiments may include more or less ECUs that are utilized.

The circuit 200 may include a first ECU 201 that is connected to a shunt resistor 207. Rather than utilizing a shunt resistor, the system may utilize an electro-magnetic probe to take measurements of the circuit. The shunt resistor 207 may take voltage measurements of the first ECU 207. For example, the shunt resistor 207 may detect a voltage drain of the first ECU 207. In another embodiment, the circuit 200 may include additional ECUs that can detect physical properties of an ECU or circuit. The shunt resistor 207 may be grounded out as shown in circuit 200.

The IDS 205 may be utilized to store the fingerprint. In another embodiment, the IDS may be utilized to draw measurements from the first ECU 201 that is connected to the shunt resistor 207 or another type of sensor or probe. The IDS 205 may thus make the determination of whether an anomaly has occurred that requires a countermeasure to be executed. The fingerprint may be code that is utilized to identify normal operation of the system by utilizing one or more measurements of physical attributes from one or more ECUs of the system. The measurements may be derived from a sensor that can be utilized to identify physical attributes of the ECUs or the system. For example, the system may utilize a sensor such as a microphone, accelerometer, gyroscope, thermal component (thermistor), thermometers, or any other similar internal or external sensors, etc. For example, the system may derive a fingerprint from utilizing a physical measurement of current or voltage from an ECU, as well as a temperature of the ECU. The system may measure the voltage across a resistor (e.g., shunt resistor 207). The shunt resistor 207 may act as a voltage divider. Depending on the resistance (load) of the ECU, the ratio between shunt resistor resistance (which is static) and the ECU may change, which leads to the voltage drop across the shunt 207. The voltmeter across the shunt 207 can therefore be used to get an absolute and/or relative information about the load of the ECU. To perform the actual measurement and transform that measurement it to a digital value that can be analyzed, the system may utilize an analog-to-digital converter (ADC) or an operational amplifier (op-amp). Such an embedded ADC may be available in a microcontroller.

In an alternative embodiment, the measurements could be transmitted to a gateway or network IDS that is remote from the circuit. The remote IDS may then take measurements of the circuit and do the comparisons. The network transmission could be correlated with the processing by sending a signature of the processing after the transmission of critical messages. The transmission of an injected message would ideally have a different signature since there wouldn't be processing involved. Remote attestation capabilities may also be added to allow the network IDS to send challenges that trigger a special sequence of functions or instructions which result in a finger print (resulting from measurements of power consumption, timings, sound, temperature, vibration, or other physical attributes, etc.). The fingerprints may be sent to a verifier (which can be a protected area of the same device, a different local device, or a remote device or cloud service) where the fingerprints are verified. The fingerprints may be derived from a physical measurement can also be used to define a context (e.g., a specific situation in which the device is running, such as driving slowly, driving fast, stopped, etc.) The context may be utilized in turn to be used to specify rules (e.g., how to respond) by the IDS.

FIG. 3 illustrates a profiling and runtime phase of an intrusion detection system. The profiling phase may also be called the training phase or baseline phase. The intrusion detection system may utilize physical measurements to fingerprint software running on an integrated circuit, as disclosed in application Ser. No. 16/723,861, filed on Dec. 20, 2019, and entitled "A SYSTEM AND METHOD FOR NETWORK INTRUSION DETECTION BASED ON PHYSICAL MEASUREMENTS", which is hereby incorporated by reference in its entirety. The current disclosure include additional features of the previous IDS by using Mel-frequency cepstral coefficient (MFCC) features for machine learning methods. Time-series data may be utilized in the intrusion detection system. The multi-channel representation may include multiple visible channels and depth information. From these raw representation a multi-channel histogram feature vector for each channel may be derived, which in turn is the input to the classifier.

Machine Learning (ML)-based Intrusion Detection System (IDS) may need preprocessed features from the raw measurements. Pre-processing may introduce certain limitations in both computational complexity and accuracy. Deep Learning (DL)-based methods—on the other hand—are able to work on the raw traces, as they learn or train to extract their own features, and combine these extracted features to classify the input. Many deep learning methods are optimized for multi-dimensional input data (2D or 3D grayscale/color images and videos). The traces in these use case, however, may be one-dimensional. Hence, they cannot make use of many technical improvements made in the DL-based image classification domain. In general, the system may improve the ability of any classification to make the right decision when it comes to classifying whether a particular software routine was executed in a (embedded) processor or not and, more importantly, whether the software routine has been modified.

The intrusion detection system may work in two phases, an enrollment phase (e.g., training phase) and a runtime phase. In the enrollment phase, an external or internal sensor performs a device measurement of a physical property (e.g. power, timing, sound, temperature, vibration, etc.) to perform an initial baseline measurement. This measurement may be used to derive a fingerprint using, e.g., machine learning (ML)/deep learning (DL) techniques, signal processing techniques or a combination thereof. A possible variation includes an enrollment process which includes protection of the model in a secure part of the processor hosting the IDS. It could be protected using, for example, a secure processor or secure memory or both.

At step 301, the IDS may receive 1D physical measure for a function $x_i$ that was executed on ECU 201. In the training phase the raw one dimensional (1D) measurement of a known function $x_i$ may be transformed into a multi-dimensional image, as shown in step 303. The system may transform the measurement to a multi-dimensional image using various techniques, such as, e.g., MFCC or Spectrograms. The system can encode each channel by using different frequency bands for each channel of the input image. For example, in the first channel, one can include "standard" MFCC coefficients, and in subsequent channels, one can include variations of these original frequencies. This may be similar to an image filter tower (pyramid) as is standard in image processing.

The image can then be used as an input to a Convolutional Neural Network (CNN) that would normally be used to classify or label images. Thus at step 305, the image may be sent to an untrained or pre-trained CNN. It is also possible to use a pre-trained network, such as Visual Geometry Group (VGG).

At step 307, the function $x_i$ may be used as a label in, e.g., a one-hot encoded vector among all the known functions without the fully connected and classification layers. The labels may be utilized to tune the program classifications. One element can be added as a placeholder for unknown—potentially malicious functions. Importantly, if multiple 1D measurements are retrieved from different sources (e.g., this could include different sensors providing different sensory streams or different sensors providing different quality measurements of the same sensor stream), they may be combined to form a multi-channel image, similar to a color image being composed of three color channels corresponding to red (R), green (G) and blue (B) colors.

In one example, a first algorithm is shown below to transform the measurements to images, labeled as Algorithm 1.

---

Algorithm 1 1D signal to 2D-n-channel image transformation for multiple sensor streams

---

Input: 1-dimensional signals $x_1, x_2, x_3, ... x_N$ from different sensory sources, where $x_i \in R^{1 \times t}$
Output: 2-Dimensional-channel image $I \in R^{u,v,n}$, with each channel $y_i \in R^{u,v}$
  1: procedure MAKEMULTICHANNELIMAGE($X_i$, i = 1...n)
  2:    for $x_i$, i $\in$ [1,n] do
  3:      $y_i \leftarrow T(x_i)$. T is one or a subset of MFCC, Spectrogram, GAF, MTF, RP, etc. always including MFCC or Spectrogram
  4:      $I[\cdot,\cdot,i] \leftarrow y_i$                                     Assign $y_i$ to ith image channel
  5:    end for
  6:    return I
  7: end procedure

---

FIG. 4 illustrates an example of a testing or runtime routine of the intrusion detection system. The 1D traces may be transformed to 2D/3D traces to extract more meaningful features. Transforming the 1D traces into 2D images may allow for use of highly optimized networks, such as a VGG, utilize pre-trained networks, use image-specific techniques such as image data augmentation (e.g. rotation, noise, scaling), and make it easier for the network to extract relevant features, while not limiting the amount of potential features (because information is not being compressed).

At step 401, the system may receive one-dimensional physical measurements for functions to be verified from one or more sensors. One of skill in the art may recognize that the idea can be applied to any other domain where multiple sensory streams are available and can be used in combination to improve classification. Additional example applications can include surveillance applications, such as those that include multiple streams of sound, video, vibration, etc. are available to detect an event in a home, airport, public area, etc. An additional application may include biometric applications that include multiple biometric modalities that are available such as measurement from a fingerprint or iris, blood flow, temperature, human voice, etc. Yet another application may include device identification that is similar to an IDS but aim is to identify a physical (possibly electronic) device uniquely from physical characteristics or properties intrinsic to the device. These can include memory behavior, delay behavior of circuits, frequency characteristics when a system has been excited with another signal (the signal being a current or a voltage). In yet another embodiment, the system may be utilized in autonomous driving. In autonomous vehicles there are multiple sensory streams being collected (radar (short and medium range)), vision (regular spectrum and IR), sound, etc. Such sensory streams could be combined in the same manner as described in this disclosure to improve detection and identification of objects for purposes of improving decision making by the autonomous vehicle. Finally, more generally in applications where sensor fusion can be of benefit, the same technique can be used to improve classification.

During the run-time of the device, power measurements (or other physical properties) can be done at a specific time window or various time windows. These measurements may then be processed in the same way as during the enrollment phase and compared to the baseline measurements. If the fingerprint doesn't match the expected fingerprint of that function (within a defined threshold or deviation), it may be assumed that the function was—potentially maliciously—modified. Thus, the system may identify a significant deviation from the original measurement in a comparison step using an appropriate metric or distance measure that is performed between the runtime measurement and baseline measurement. Similarly, a potential variation in the IDS may include a running phase as above, but upon getting a classification from the classifier, the IDS system uses this information as well as other information typically gathered by an IDS system (data ranges, frequency of messages, etc.) to take an appropriate action. This could simply be raised as an alarm and inform a user of the system where the IDS is running or a more protective measure such as for example disconnecting the malicious component from the network, reducing its communication capabilities, blocking all messages sent by the suspicious ECU, etc.

One aspect may be that the physical measurement is transformed into a multi-dimensional domain, as shown in step 403. These transformed inputs may then be used as inputs for (deep) neural networks, as shown in step 405. The IDS may thus utilize measurements from one-dimensional measurements and convert to two-dimensional measurements. The IDS may then create multi-dimensional "images" (i.e. multi-channel), in particular, in the context of checking whether a particular piece of software running in a processor has been modified. FIG. 3 and FIG. 4 show the training and testing phase of using a deep neural network to classify functions based on transformed physical measurements proposed in this disclosure, as shown in step 407.

After the neural network (e.g., including a machine learning algorithm) has been trained on data for all known functions, it can be used as a countermeasure against an attacker that is able to compromise the software of an embedded device such as an ECU. Physical measurements are constantly recorded during runtime for each function that is being run. Each of these measurements is transformed into an image, in the same way it was being done during the training phase. The image is then used as an input for the trained neural network. The calculated output of the neural network may be the predicted class. If the labelled class matches the expected class with a sufficiently high confidence (e.g., it can be tuned depending on the Receiver Operating Characteristic (ROC) curve requirements), it can be seen as a benign function. On the other hand, if either the confidence of the classification is not high enough, or it was labelled as the unknown function; the measured function may be seen as potentially malicious. Thus, the classification may be utilized to determine if the multiple measurements show normal runtime operation, or an abnormal operation, such as a cyber-attack (virus, malware, or any malicious unauthorized software modification, etc.). If an attack is occurring, various countermeasures may occur, such as ending the program, aborting operation, etc.

Different transformation techniques may be utilized, including Gramian Angular Field (GAFs), Markov Transition Fields (MTFs), Recurrence Plots (RPs), spectrograms using short Fourier transforms. A 2D image with spectral frequency information such as for example, MFCCs or spectrograms using Fourier transforms.

Multiple transformation techniques can be combined in different channels of the image. This technique is shown, for example, in FIG. 3 and FIG. 4. The transformation technique in combination to multiple sensory streams may be combined into a single 3D-image. Thus, all channels may be combined into a single network as opposed to each sensory stream being analyzed independently and then combined through a fusion layer. Image transformation techniques can be applied to the transformed data to improve the training accuracy and generalization of the network. The system may also utilize pre-trained networks instead of training a complete network.

An alternative where the channels are constructed from different transforms as shown in Algorithm 2 shown below.

---

Algorithm 2 1D signal to 2D-n-channel image transformation for single sensor streams

---

Input: 1-dimensional signal $x \in R^{1 \times t}$ from single sensory source, n different transforms $T_i$
Output: 2-Dimensional, n-channel image $I \in R^{u,v,n}$, with each channel $y_i \in R^{u,v}$
  1: procedure MAKEMULTICHANNELIMAGE(x, $T_i$, i = 1...n)
  2:    for $T_i$, i $\in$ [1,n] do
  3:    $y_i \leftarrow T_i(x)$ . $T_i$ is one or a subset of MFCC, Spectrogram, GAF, MTF, RP, etc. always including MFCC or Spectrogram
  4:    $I[\cdot,\cdot,i] \leftarrow y_i$       Assign $y_i$ to ith image channel
  5:    end for
  6:    return I
  7: end procedure

---

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM or flash memory devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, power consumption, overall electromagnetic radiation, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
    memory;
    a processor in communication with the memory and programmed to:
        define a fingerprint that includes a baseline measurement of a physical attribute of at least a separate processor during an enrollment period of the system, wherein the enrollment period includes measuring the physical attribute of the separate processor prior to runtime operation;
        receive a runtime measurement from a plurality of sensors regarding the physical attribute of at least the separate processor during runtime operation;
        output a multi-dimensional domain image in response to the runtime measurement, wherein the multi-dimensional image is utilized to identify a deviation between the baseline measurement and the runtime measurement; and
        wherein the processor is configured to transform the multi-dimensional image utilizing Mel frequency cepstral coefficients or spectrograms.

2. The system of claim 1, wherein the baseline measurement includes one-dimensional signals retrieved from different sensory sources.

3. The system of claim 1, wherein the multi-dimensional domain image is associated with one or more sensory source channels.

4. The system of claim 1, wherein the processor is configured to train a machine learning algorithm in response to one or more multi-dimensional domain images.

5. The system of claim 1, wherein the processor is configured to output the multi-dimensional domain image to a deep neural network.

6. The system of claim 1, wherein the processor is configured to output the multi-dimensional domain image to an untrained neural network during the enrollment period.

7. The system of claim 1, wherein the processor is configured to output the multi-dimensional domain image to a deep neural network, and the deep neural network is configured to classify executed operations by the separate processor in response to the multi-dimensional domain image.

8. The system of claim 1, wherein the processor is configured to output the multi-dimensional domain image to an untrained neural network during the enrollment period in response to the baseline measurement, and the untrained neural network is configured to label a function in response to the multi-dimensional image.

9. The system of claim 1, wherein the multi-dimensional domain image includes a plurality of channels encoded into the multi-dimensional domain image.

10. A computer-implemented method, comprising:
    receiving a baseline measurement that includes a physical attribute of at least a processor during an enrollment period, wherein the enrollment period includes measuring the physical attribute of the processor prior to runtime operation;
    receiving a runtime measurement from a sensor regarding the physical attribute of at least the processor during runtime operation;
    outputting a multi-dimensional domain image in response to the runtime measurement;
    identify a deviation between the baseline measurement and the runtime measurement utilizing the multi-dimensional image;
    execute a countermeasure operation against software ran by the processor in response to the deviation; and
    wherein the processor is configured to transform the multi-dimensional image utilizing Mel frequency cepstral coefficients or spectrograms.

11. The computer-implemented method of claim 10, training a neural network in response to the multi-dimensional domain image.

12. The computer-implemented method of claim 10, wherein the method includes sending the multi-dimensional image to an untrained machine learning network; and labeling the multi-dimensional image as a function utilizing the untrained machine learning network.

13. The computer-implemented method of claim 10, wherein the physical attribute includes temperature, sound, voltage, amperage, power consumption, or vibration.

14. The computer-implemented method of claim 10, wherein the baseline measurement includes information retrieved from a plurality of sensors.

15. The computer-implemented method of claim 10, wherein the processor is further configured to output the multi-dimensional domain image to an untrained machine learning network during the enrollment period in response to the baseline measurement, and wherein the untrained machine learning network is configured to label a function in response to the multi-dimensional image.

16. The computer-implemented method of claim 10, the processor is further configured to encode each channel by using different frequency bands for each channel of the multi-dimensional image.

17. A system comprising:
    memory;
    a processor in communication with the memory and programmed to:
        receive a plurality of runtime measurements from a plurality of sensors regarding a physical attribute of at least a separate processor during runtime, wherein the runtime measurement is a one-dimensional measurement;
        convert each of the plurality of the runtime measurements to a multi-dimensional image;
        send the multi-dimensional image to a neural network and output a classification of the multi-dimensional image utilizing the neural network; and
        wherein the processor is configured to transform the multi-dimensional image utilizing Mel frequency cepstral coefficients or spectrograms.

18. The system of claim 17, wherein processor is further programmed to encode each of channel of the multi-dimensional image by using different frequency bands for each channel.

19. The system of claim 17, wherein the neural network is trained utilizing a plurality of multi-dimensional images.

\* \* \* \* \*